(12) United States Patent
Pawliczek et al.

(10) Patent No.: US 12,269,594 B2
(45) Date of Patent: Apr. 8, 2025

(54) LIGHT MODULE FOR AN ELONGATED INTERIOR AIRCRAFT LIGHT, ELONGATED INTERIOR AIRCRAFT LIGHT, AND METHOD OF ASSEMBLING AN ELONGATED INTERIOR AIRCRAFT LIGHT

(71) Applicant: Goodrich Lighting Systems GmbH & Co. KG, Lippstadt (DE)

(72) Inventors: Carsten Pawliczek, Lippstadt (DE); Andre Hessling-Von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/348,426

(22) Filed: Jul. 7, 2023

(65) Prior Publication Data
US 2024/0010339 A1 Jan. 11, 2024

(30) Foreign Application Priority Data
Jul. 8, 2022 (EP) ..................................... 22183786

(51) Int. Cl.
*B64D 11/00* (2006.01)
*F21S 4/28* (2016.01)
*F21W 106/00* (2018.01)
*F21Y 103/10* (2016.01)
*F21Y 113/13* (2016.01)
(Continued)

(52) U.S. Cl.
CPC ................ *B64D 11/00* (2013.01); *F21S 4/28* (2016.01); *H05B 45/20* (2020.01); *B64D 2011/0038* (2013.01); *B64D 2011/0053* (2013.01); *B64D 2203/00* (2013.01); *F21W 2106/00* (2018.01);
(Continued)

(58) Field of Classification Search
CPC ..... F21S 4/28; F21S 4/20; F21S 2/005; B64D 2011/0038; B64D 2011/0053; B64D 47/02
See application file for complete search history.

(56) References Cited

U.S. PATENT DOCUMENTS 8,513,871 B2 8/2013 You et al.
10,464,673 B2 * 11/2019 Hessling-Von Heimendahl ......... B64D 45/0053
(Continued)

FOREIGN PATENT DOCUMENTS

EP 3323722 A1 5/2018

OTHER PUBLICATIONS

Extended European Search Report for Application No. 22183786.7, mailed Jan. 5, 2023, 10 pages.

*Primary Examiner* — William N Harris
(74) *Attorney, Agent, or Firm* — CANTOR COLBURN LLP

(57) ABSTRACT

A light module for an elongated interior aircraft light comprises a plurality of light sources, which are configured for emitting light of different colors and which are arranged next to each other, forming an array of light sources extending between a first end and a second end along a longitudinal direction (LD). The plurality of light sources include a first light source, which is arranged at the first end, and a second light source, which is arranged at the second end. The first and second light sources are those from the plurality of light sources that result in a difference of the illuminating properties between the first and second light sources being the smallest difference that is possible for all potential pairs of light sources formed from the plurality of light sources.

15 Claims, 11 Drawing Sheets

(51) Int. Cl.
*F21Y 115/10* (2016.01)
*H05B 45/20* (2020.01)

(52) U.S. Cl.
CPC ....... *F21Y 2103/10* (2016.08); *F21Y 2113/13* (2016.08); *F21Y 2115/10* (2016.08)

(56) References Cited

U.S. PATENT DOCUMENTS

| | | |
|---|---|---|
| 11,242,001 B2 | 2/2022 | Ueberschaer et al. |
| 2007/0230171 A1* | 10/2007 | Hiratsuka ................. F21S 4/28 362/235 |
| 2008/0186721 A1* | 8/2008 | Vogel ....................... B60Q 3/47 345/694 |
| 2017/0001556 A1 | 1/2017 | Bergeler |
| 2020/0254920 A1 | 8/2020 | Kessels et al. |

* cited by examiner

|        | u'    | v'    |
|--------|-------|-------|
| Blue   | 0.210 | 0.085 |
| Cyan   | 0.129 | 0.413 |
| Green  | 0.098 | 0.566 |
| Amber  | 0.325 | 0.549 |
| Red    | 0.473 | 0.526 |
| White  | 0.225 | 0.503 |

|       | Cyan  | Green | Amber | Red   | White |
|-------|-------|-------|-------|-------|-------|
| Blue  | 0.338 | 0.493 | 0.478 | 0.513 | 0.418 |
| Cyan  |       | 0.156 | 0.239 | 0.362 | 0.132 |
| Green |       |       | 0.227 | 0.376 | 0.141 |
| Amber |       |       |       | 0.150 | 0.110 |
| Red   |       |       |       |       | 0.249 |

|        | Cyan  | Green | Amber | Red   | White |
|--------|-------|-------|-------|-------|-------|
| Blue   | 0.338 | 0.493 |       | 0.513 | 0.418 |
| Cyan   |       | 0.156 |       | 0.362 | 0.132 |
| Green  |       |       |       | 0.376 | 0.141 |
| Amber  |       |       |       | 0.150 | 0.110 |
| Red    |       |       |       |       | 0.249 |

|        | Cyan  | Green | Amber | Red | White |
|--------|-------|-------|-------|-----|-------|
| Blue   |       |       |       |     | 0.418 |
| Cyan   |       | 0.156 | 0.239 |     | 0.132 |
| Green  |       |       | 0.227 |     | 0.141 |
| Amber  |       |       |       |     | 0.110 |
| Red    |       |       |       |     | 0.249 |

Fig. 7F
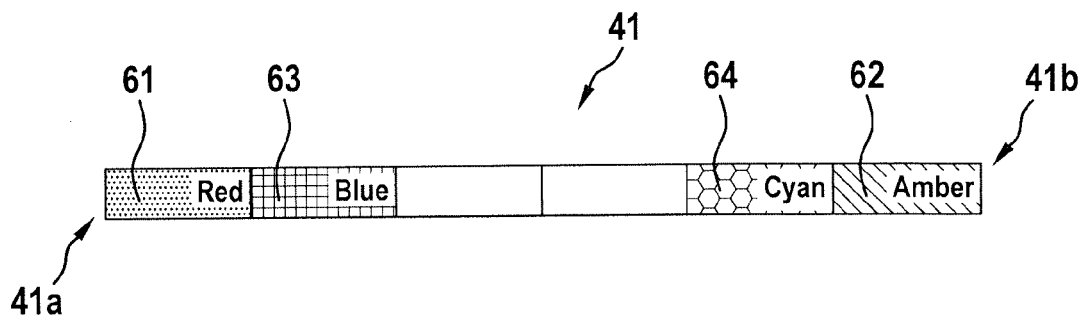
Fig. 7G
|  | Cyan | Green | Amber | Red | White |
|---|---|---|---|---|---|
| Blue |  | 0.493 |  |  | 0.418 |
| Cyan |  |  |  |  | 0.132 |
| Green |  |  |  |  | 0.141 |
| Amber |  |  |  |  | 0.110 |
| Red |  |  |  |  | 0.249 |
Fig. 7H
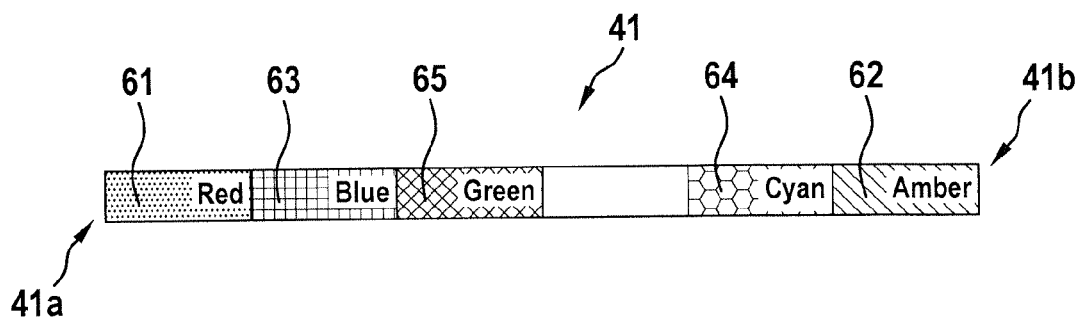

|  | u' | v' |
|---|---|---|
| Blue | 0.197 | 0.085 |
| Cyan | 0.033 | 0.532 |
| Green | 0.057 | 0.573 |
| Amber | 0.325 | 0.548 |
| Red | 0.527 | 0.521 |
| White | 0.222 | 0.498 |

|  | Cyan | Green | Amber | Red | White |
|---|---|---|---|---|---|
| Blue | 0.479 | 0.479 | 0.479 | 0.546 | 0.413 |
| Cyan |  | 0.047 | 0.293 | 0.495 | 0.192 |
| Green |  |  | 0.269 | 0.473 | 0.181 |
| Amber |  |  |  | 0.204 | 0.115 |
| Red |  |  |  |  | 0.306 |

LIGHT MODULE FOR AN ELONGATED INTERIOR AIRCRAFT LIGHT, ELONGATED INTERIOR AIRCRAFT LIGHT, AND METHOD OF ASSEMBLING AN ELONGATED INTERIOR AIRCRAFT LIGHT

CROSS REFERENCE TO RELATED APPLICATION

This application claims priority to European Patent Application No. 22183786.7 filed Jul. 8, 2022, the entire contents of which is incorporated herein by reference.

TECHNICAL FIELD

The present invention is in the field of interior aircraft lights, in particular in the field of aircraft passenger cabin lights. The present invention is in particular related to a light module for an elongated interior aircraft light, to an elongated interior aircraft light, and to a method of assembling an elongated interior aircraft light from a plurality of light modules.

BACKGROUND

Passenger aircraft, such as commercial air planes, which comprise a passenger cabin with passenger seats, are usually equipped with general passenger cabin lights for illuminating the passenger cabin.

The general passenger cabin lights may in particular include elongated interior aircraft lights, which extend along a longitudinal direction of the passenger cabin, for example along a wall, along a ceiling, along a hand rail, or along a floor of the passenger cabin. Elongated interior aircraft lights may further by employed in other locations within the passenger cabin, such as galleys, washrooms and/or toilets.

Such elongated interior aircraft lights may include a plurality of elongated light modules, which are arranged next to each other for forming the respective elongated interior aircraft light. Each of the elongated light modules may comprise a plurality of light sources, which may be configured for emitting light of different colors. In this way, colored illumination of the aircraft cabin may be made possible.

In such a configuration, there is a risk that the light, which is emitted by the light sources of the elongated light modules, results in the formation of unpleasant or disturbing spots at the interfaces or gaps between adjacent light modules. Said unpleasant or disturbing spots may, for example, include an over-pronunciation of one color and/or a mixed color that becomes very prominent along a long section of an otherwise homogeneous light distribution, which is generated by the elongated interior aircraft light.

It would therefore be beneficial to provide elongated light modules, comprising a plurality of light sources which are configured for emitting light of different colors, wherein the elongated light modules are configured such that the risk of forming unpleasant or disturbing spots at the interfaces or gaps between adjacent light modules is reduced, when the elongated light modules are arranged next to each other for forming an elongated interior aircraft light. It would further be beneficial to provide an according elongated interior aircraft light and according methods for providing such light modules and such elongated interior aircraft lights.

SUMMARY

Exemplary embodiments of the invention include a light module for an elongated interior aircraft light that comprises a plurality of light sources. The plurality of light sources are configured for emitting light of different colors and they are arranged next to each other forming an array of light sources, which extends along a longitudinal direction between a first end and a second end. The plurality of light sources include a first light source, which is arranged at the first end of the array of light sources, and a second light source, which is arranged at the second end of the array of light sources. The first and second light sources are selected in such a way from the plurality of light sources that a difference of the illuminating properties between the first and second light sources is the smallest difference that is possible between all potential pairs of light sources, which may be formed/combined from the plurality of light sources. The difference of the illuminating properties, which is minimized by an appropriate selection of the first and second light sources, is a function of the difference in chromaticity and/or in hue and/or in saturation and/or in intensity between the respective light sources.

Exemplary embodiments of the invention further include a method of arranging a plurality of light sources, which are configured for emitting light of different colors, as an array of light sources in a light module, wherein the array of light sources extends along a longitudinal direction between a first end and an opposing second end. The method includes selecting a first light source and a second light source from the plurality of light sources, so that a difference of the illuminating properties between the first and second light sources is the smallest difference that is possible between all potential pairs of light sources, which may be formed/combined from the plurality of light sources. The method further includes arranging the first light source at the first end of the array of light sources and arranging the second light source at the second end of the array of light sources. The difference of the illuminating properties, which is minimized by an appropriate selection of the first and second light sources, is a function of the difference in chromaticity and/or in hue and/or in saturation and/or in intensity between the respective light sources.

Exemplary embodiments of the invention further include an elongated interior aircraft light, comprising a plurality of light modules according to an exemplary embodiment of the invention. All light modules are assembled from the same types of light sources and comprise the same combination of light sources with respect to the colors, which are emitted by the light sources. In such an elongated interior aircraft light, the light modules are arranged next to each other for forming an array of light modules extending in the longitudinal direction. The plurality of light modules are oriented in such a way with respect to each other that, for each pair of neighboring light modules, the second light source of a first light module of the respective pair of light modules is arranged next to the first light source of a second light module of the respective pair of light modules.

Exemplary embodiments of the invention further include an aircraft, in particular a passenger aircraft, which is equipped with at least one elongated interior aircraft light according to an exemplary embodiment of the invention.

Elongated light modules according to exemplary embodiments of the invention may be combined for providing an elongated interior aircraft light, in which the risk of forming unpleasant or disturbing spots at the interfaces or gaps between adjacent light modules is considerably reduced, since light sources having highly similar illuminating properties may be arranged at said interfaces or gaps of such an elongated interior aircraft light. Despite imperfect color mixing at the interfaces or gaps between adjacent light modules, a highly even illumination of target surfaces and/or a highly pleasant/non-disturbing light output may be achieved.

In an embodiment, the difference of the illuminating properties, which determines the arrangement of the light sources within the light modules, is defined as a weighted sum of the difference in chromaticity and/or in hue and/or in saturation and/or in intensity between the respective light sources. The weighted sum may take into account any subset or all of the difference in chromaticity, the difference in hue, the difference in saturation, and the difference in intensity.

For reducing the risk of generating unpleasant or disturbing spots at the interfaces or gaps between adjacent light modules, it has been found particularly beneficial to minimize the difference in chromaticity between the first and second light sources. With minimizing the difference between the first and second light sources in another one of the listed dimensions or in a combined metric for some or all of the listed dimensions, beneficial results in reducing the risk of generating unpleasant or disturbing spots at the interfaces or gaps between adjacent light modules may also be achieved.

In an embodiment, the difference of the illuminating properties is defined as the distance between the chromaticities in the CIE1976 color space. The CIE1976 color space provides a good indication of the perception of the different colors by the human eye. Two chromaticities, which have a small distance from each other in the CIE1976 color space, are perceived as similar by the human eye.

It may therefore be beneficial to use the distances between the chromaticities in the CIE1976 color space for determining that pair of light sources from a plurality of light sources, which emit light of different colors, whose color outputs are perceived as most similar among all potential pairs of light sources, which may be formed from said plurality of light sources.

If the chromaticities of the light sources are given in a different color space, for example in the CIE1931 color space, which is often used by the suppliers of light sources, the chromaticities may be converted into the CIE1976 color space, before the distances between the chromaticities of the light sources are determined.

In an embodiment, the light module further comprises a third light source, which is arranged next or adjacent to the first light source. The third light source is selected from the remainder of the plurality of light sources, i.e. from the plurality of light sources without the first and second light sources, as they have already been assigned to their positions within the light module. The third light source may in particular be selected so that the difference of the illuminating properties between the first and third light sources is the largest difference of the illuminating properties that is possible for all pairs of light sources, which may be formed from the first light source and a respective one of the remainder of the plurality of light sources.

The first and third light sources may be arranged at a small distance from each other, e.g. at a distance which is smaller than 5 mm. The first and third light sources may even be arranged abutting each other. When the first and third light sources are arranged at such a small distance from each other, there is a large overlap of the light emissions, which are emitted by the two light sources. This overlap results in an efficient blending of the light emissions having different colors, which are emitted by the first and third light sources. This efficient blending results in a homogeneous illumination, even if the difference between the illuminating properties, in particular between the chromaticities, of the two light sources is large.

In an embodiment, the light module further comprises a fourth light source, which is arranged next or adjacent to the second light source. The fourth source is selected from the remainder of the plurality of light sources, i.e. from the plurality of light sources without the first, second, and third light sources, as they have already been assigned to their positions within the light module. The fourth light source may be selected so that the difference of the illuminating properties between the second and fourth light sources is the largest difference that is possible for all pairs of light sources, which may be formed from the second light source and a respective one of the remainder of the plurality of light sources.

The second and fourth light sources may be arranged at a small distance from each other, e.g. at a distance which is smaller than 5 mm. The second and fourth light sources may even be arranged abutting each other. When the second and fourth light sources are arranged at such a small distance from each other, there is a large overlap of the light emissions, which are emitted by the two light sources. This overlap results in an efficient blending of the light emissions having different colors, which are emitted by the second and fourth sources. This efficient blending results in a homogeneous illumination, even if the difference between the illuminating properties, in particular between the chromaticities, of the two light sources is large.

In an embodiment, the light module further comprises a fifth light source, which is arranged next or adjacent to the third light source. The fifth light source is selected from the remainder of the plurality of light sources, i.e. from the plurality of light sources without the first, second, third, and fourth light sources, as they have already been assigned to their positions within the light module. The fifth light source may be selected so that the difference of the illuminating properties between the third and fifth light sources is the largest difference that is possible for all pairs of light sources, which may be formed from the third light source and a respective one of the remainder of the plurality of light sources.

The third and fifth light sources may be arranged at a small distance from each other, e.g. at a distance which is smaller than 5 mm. The third and fifth light sources may even be arranged abutting each other. When the third and fifth light sources are arranged at such a small distance from each other, there is a large overlap of the light emissions, which are emitted by the two light sources. This overlap results in an efficient blending of the light emissions having different colors, which are emitted by the third and fifth sources. This efficient blending results in a homogeneous illumination, even if the difference between the illuminating properties, in particular between the chromaticities, of the two light sources is large.

In an embodiment, the light module further comprises a sixth light source, which is arranged next or adjacent to the fourth light source. The sixth light source is selected from the remainder of the plurality of light sources, i.e. from the plurality of light sources without the first, second, third, fourth, and fifth light sources, as they have already been assigned to their positions within the light module. The sixth light source may be selected so that the difference of the illuminating properties between the fourth and sixth light sources is the largest difference that is possible for all pairs of light sources, which may be formed from the fourth light source and a respective one of the remainder of the plurality of light sources.

The fourth and sixth light sources may be arranged at a small distance from each other, e.g. at a distance which is smaller than 5 mm. The fourth and sixth light sources may even be arranged abutting each other. When the fourth and sixth light sources are arranged at such a small distance from each other, there is a large overlap of the light emissions, which are emitted by the two light sources. This overlap results in an efficient blending of the light emissions having different colors, which are emitted by the fourth and sixth sources. This efficient blending results in a homogeneous illumination, even if the difference between the illuminating properties, in particular between the chromaticities, of the two light sources is large.

In an embodiment, the plurality of light sources include at least one white light source, which is configured for emitting white light. White light may be defined as a region within a color space, in particular as a region within the CIE1976 color space.

White light may, for example, be defined as the region within the CIE1976 color space which is centered at the point u'=0.22 and v'=0.50 of the CIE1976 color space. The region, which defines the white light, may have a radius in the range of between 0.02 and 0.05 in the CIE1976 color space.

In an embodiment, said at least one white light source is disregarded when the light sources are successively selected for forming pairs of light sources having the smallest or largest difference between their illuminating properties, as it has been described before. Instead, the at least one white light source may be assigned to the last free position(s) on the light module, after all other light sources from the plurality of light sources have been assigned to their respective positions within the light module.

The white light, which is emitted by a white light source, may have a much larger intensity than the light, which is emitted by other light sources, which are configured for emitting colored light, such as red, blue, cyan, amber or green light.

In consequence, the chromaticity of light, which is emitted by a white light source, is not really comparable with the chromaticity of light, which is emitted by such other light sources. It is therefore beneficial to exclude a white light source from said comparison and to assign said at least one white light source to the last free position(s) within the light module, after all other light sources from the plurality of light sources have been assigned to their respective positions within the light module.

In an embodiment, the plurality of light sources are LEDs, or each of the plurality of light sources comprises at least one LED. LEDs provide reliable and efficient light sources, which are available at low costs. The light sources may further comprise optical elements, such as reflectors or lenses, for forming the light output provided by the light sources. It is also possible that the light module comprises one or more optical elements, such as reflectors or lenses, which affect(s) the light output of multiple or all of the plurality of light sources.

In an embodiment, the light module comprises six light sources. Light modules comprising six light sources, which are configured for emitting light of different colors, have been found as well suited for providing a wide variety of differently colored illuminations.

In an embodiment, the light sources, when listed in an order, which corresponds to the sequence of the light sources in the array of light sources, are configured to emit light having the following colors: amber, blue, cyan, white, green, orange.

In an embodiment, the light sources, when listed in an order, which corresponds to the sequence of the light sources in the array of light sources, are configured to emit light having the following colors: red, blue, green, white, cyan, amber.

In an embodiment, the light sources, when listed in an order, which corresponds to the sequence of the light sources in the array of light sources, are configured to emit light having the following colors: green, blue, amber, white, red, cyan.

Light modules, in which the light sources are arranged in one of the above mentioned sequences, are well suited for providing elongated interior aircraft lights, which are able to provide a wide variety of differently colored illuminations, wherein the risk of generating unpleasant or disturbing spots at the interfaces or gaps between adjacent light modules is considerably reduced.

The above mentioned sequences are, however, only exemplary. The principles of arranging the light sources within the light modules, which have been described before, may result in different sequences of the light sources, if other light sources, which emit light of other chromaticities, are used.

BRIEF DESCRIPTION OF THE DRAWINGS

Further exemplary embodiments of the invention are described in the following with respect to the accompanying drawings, wherein:

FIG. 7F schematically depicts a light module, in which the first, second, third, and fourth light sources have been selected from the first exemplary selection of light sources and have been arranged in the light module;

FIG. 7G depicts a table comprising entries, which indicate the distances in the CIE1976 color space between the chromaticities of the light emissions, which are emitted by the light sources, for every possible pair of light sources, which may be formed from the remaining light sources of the first exemplary selection of light sources;

FIG. 7H schematically depicts a light module, in which the first, second, third, fourth, and fifth light sources have been selected from the first exemplary selection of light sources and have been arranged in the light module;

DETAILED DESCRIPTION

Figure 1:
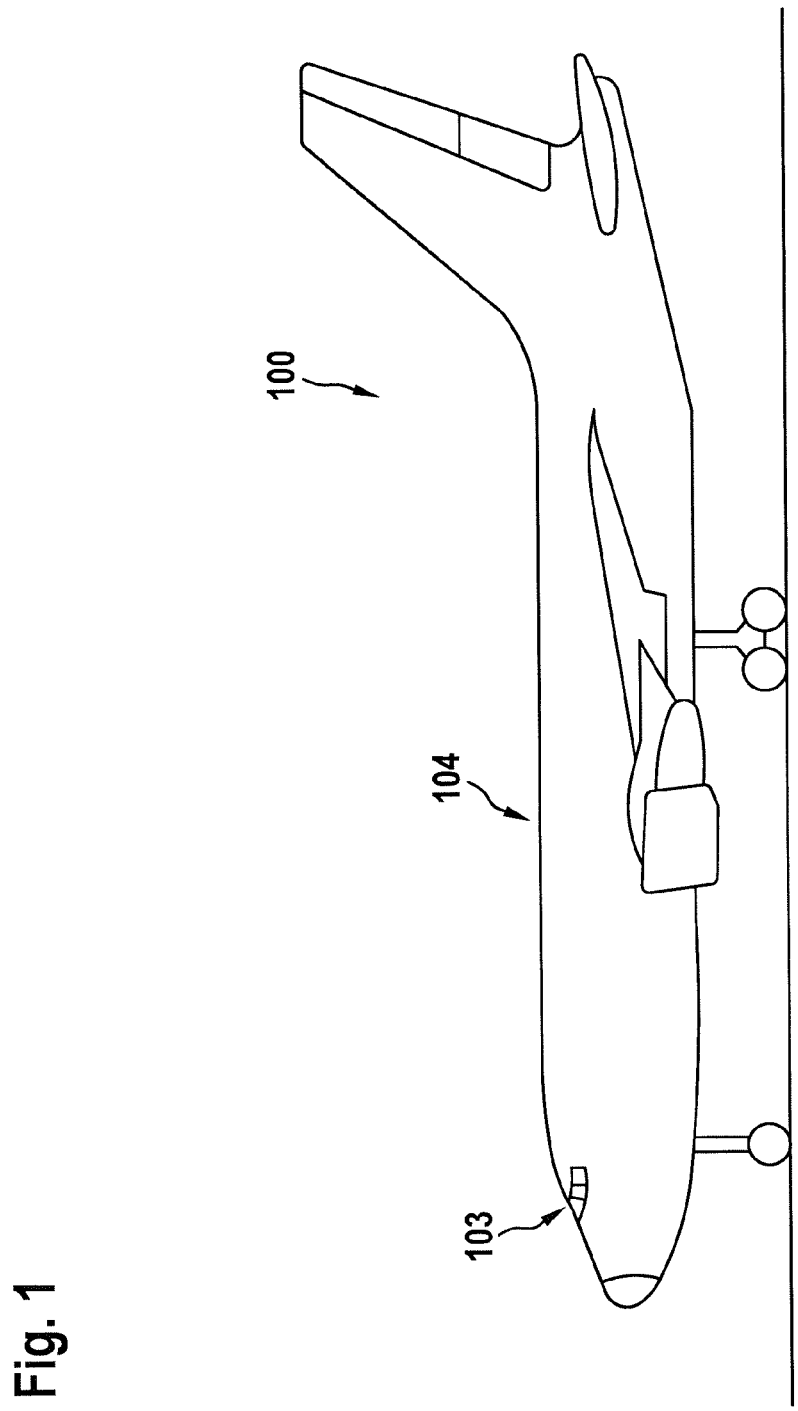
FIG. 1 depicts a schematic side view of an aircraft in which an elongated interior aircraft light according to an exemplary embodiment of the invention may be employed.

FIG. 1 depicts a schematic side view of an aircraft 100, in particular of an air plane, in accordance with an exemplary embodiment of the invention. In the exemplary embodiment shown in FIG. 1, the aircraft 100 is a large passenger air plane, comprising a cockpit 103 and a passenger cabin 104. The aircraft 100 may be a commercial passenger air plane, a private air plane, or a military aircraft. It is also possible that the aircraft is a rotorcraft, such as a helicopter.

Figure 2:
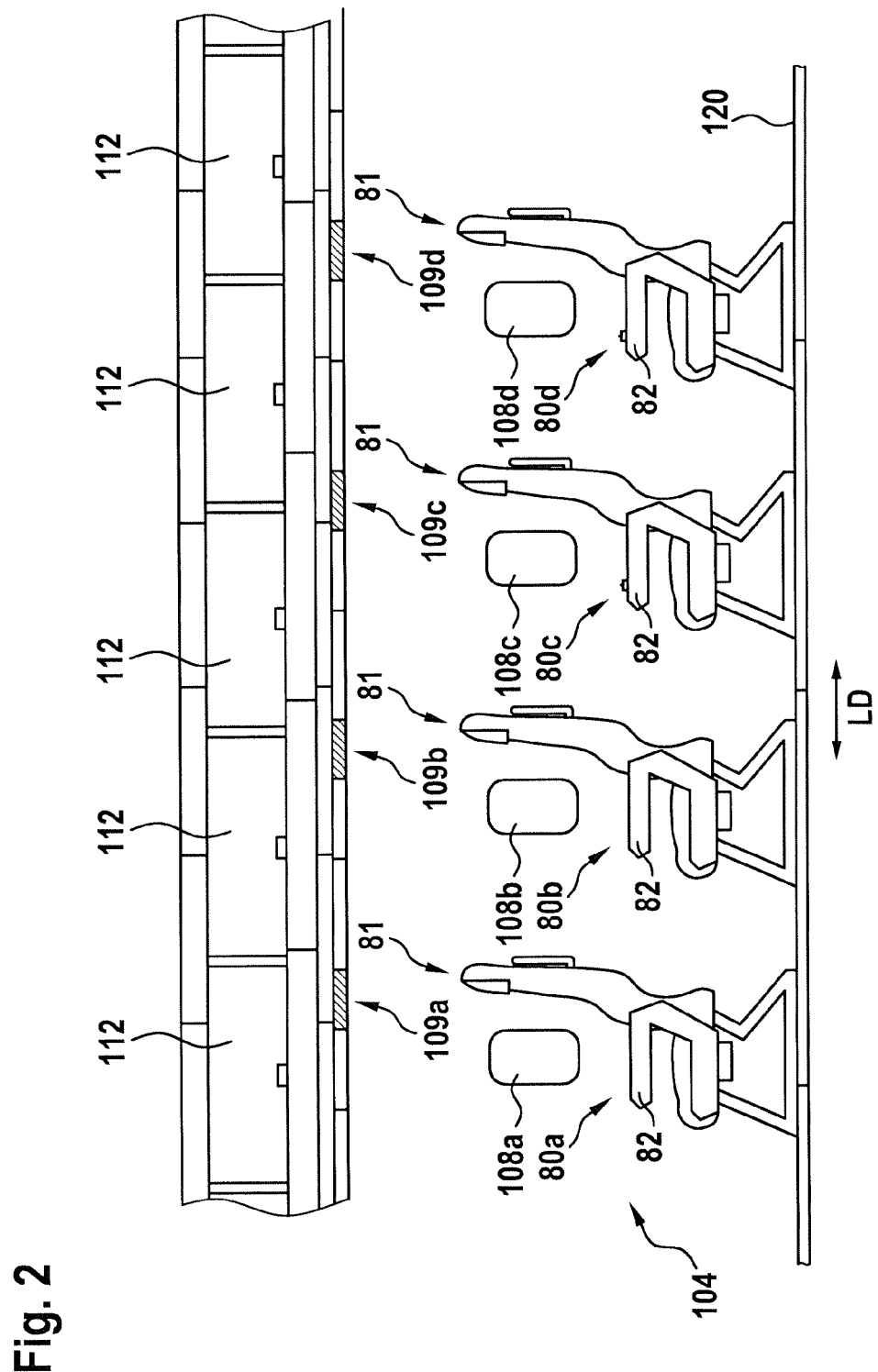
FIG. 2 depicts a schematic longitudinal cross-sectional view of a section of a passenger cabin of the aircraft of FIG. 1.

FIG. 2 shows a schematic longitudinal cross-sectional view of a section of the passenger cabin 104 of the aircraft 100, which is shown in FIG. 1.

Four seats 81, which are also referred to as passenger seats 81, are visible in FIG. 2. The passenger seats 81 comprise arm rests 82 and are mounted to a floor 120 of the passenger cabin 104. Each of the depicted passenger seats 81 belongs to a different seat row 80a-80d. The seat rows 80a-80d are spaced apart from each other along the longitudinal direction LD of the passenger cabin 104.

For each of the seat rows 80a-80d, a window 108a-108d is provided, which allows the passengers to view the outside of the aircraft 100. Further, a plurality of overhead baggage compartments 112, which provide storage space for the passengers' baggage, are provided above the passenger seats 81.

Each seat row 80a-80d may include a plurality of passenger seats 81, for example three passenger seats 81, which are arranged next to each other along a lateral direction T, which is orthogonal to the longitudinal direction LD. The additional passenger seats, i.e. the middle seat and the window seat, of each seat row 80a-80d are not visible in FIG. 2, as they are arranged behind and therefore hidden by the depicted aisle seats 81. The hidden passenger seats are visible in FIG. 3, which will be discussed in detail further below.

An aircraft overhead passenger service unit (PSU) 109a-109d is provided above each of the seat rows 80a-80d, respectively.

One or more elongated interior aircraft lights in accordance with exemplary embodiments of the invention may be arranged in the depicted section of the passenger cabin 104. In particular, there may be one or more aircraft passenger cabin lights, which are examples of elongated interior aircraft lights in accordance with exemplary embodiments of the invention and which are not visible in FIG. 2. The aircraft passenger cabin lights may extend in the longitudinal direction LD behind the aircraft overhead passenger service units 109a-109d and/or behind/above the overhead baggage compartments 112. An example of such an elongated interior aircraft light is shown in FIG. 3.

Figure 3:
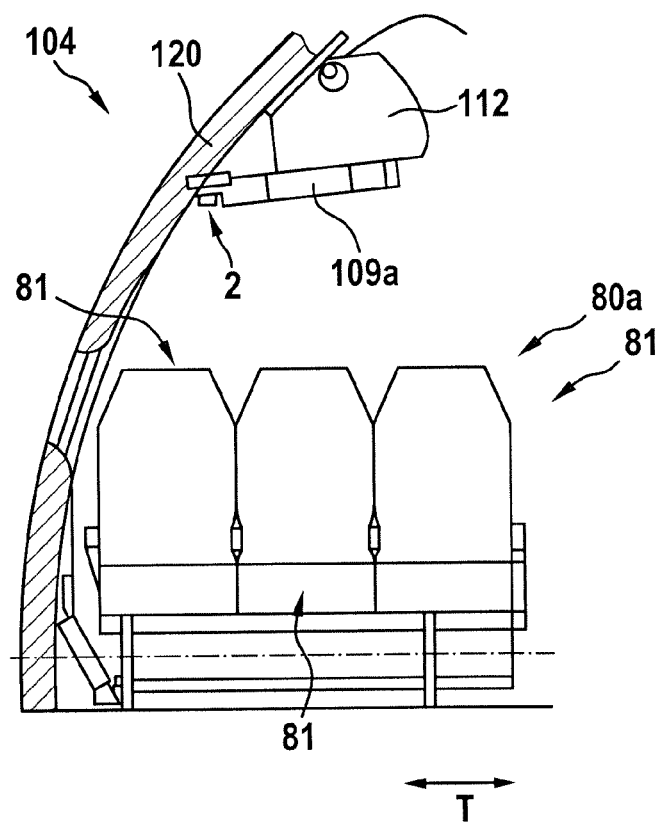
FIG. 3 depicts a schematic lateral cross-sectional view of a portion of the passenger cabin of the aircraft shown in FIG. 1.

FIG. 3 depicts a schematic partial cross-sectional view of the passenger cabin 104 in a plane which is oriented in a lateral direction, i.e. in a plane which is orthogonal to the plane of the longitudinal cross-sectional view depicted in FIG. 2.

FIG. 3 shows a single seat row 80a comprising three passenger seats 81, which are arranged next to each other along the lateral direction T.

An overhead baggage compartment 112 and a passenger service unit 109a are installed above the seat row 80a.

An aircraft passenger cabin light 2, which is an example of an elongated interior aircraft light in accordance with an exemplary embodiment of the invention, is installed above the passenger seats 81. The exemplary aircraft passenger cabin light 2 of FIG. 3 is configured for providing general cabin wall illumination.

The aircraft passenger cabin light 2 is arranged at or next to a side wall 120 of the passenger cabin 104 and extends along the longitudinal direction LD of the passenger cabin 104, i.e. it extends orthogonal to the drawing plane of FIG. 3. The exemplary aircraft passenger cabin light 2 may extend along a plurality of seat rows 80a along the longitudinal direction LD or may have an extension that is comparable to a single seat row spacing.

In the following, the details of an elongated interior aircraft light 2 according to an exemplary embodiment of the invention will be discussed.

Figure 4:
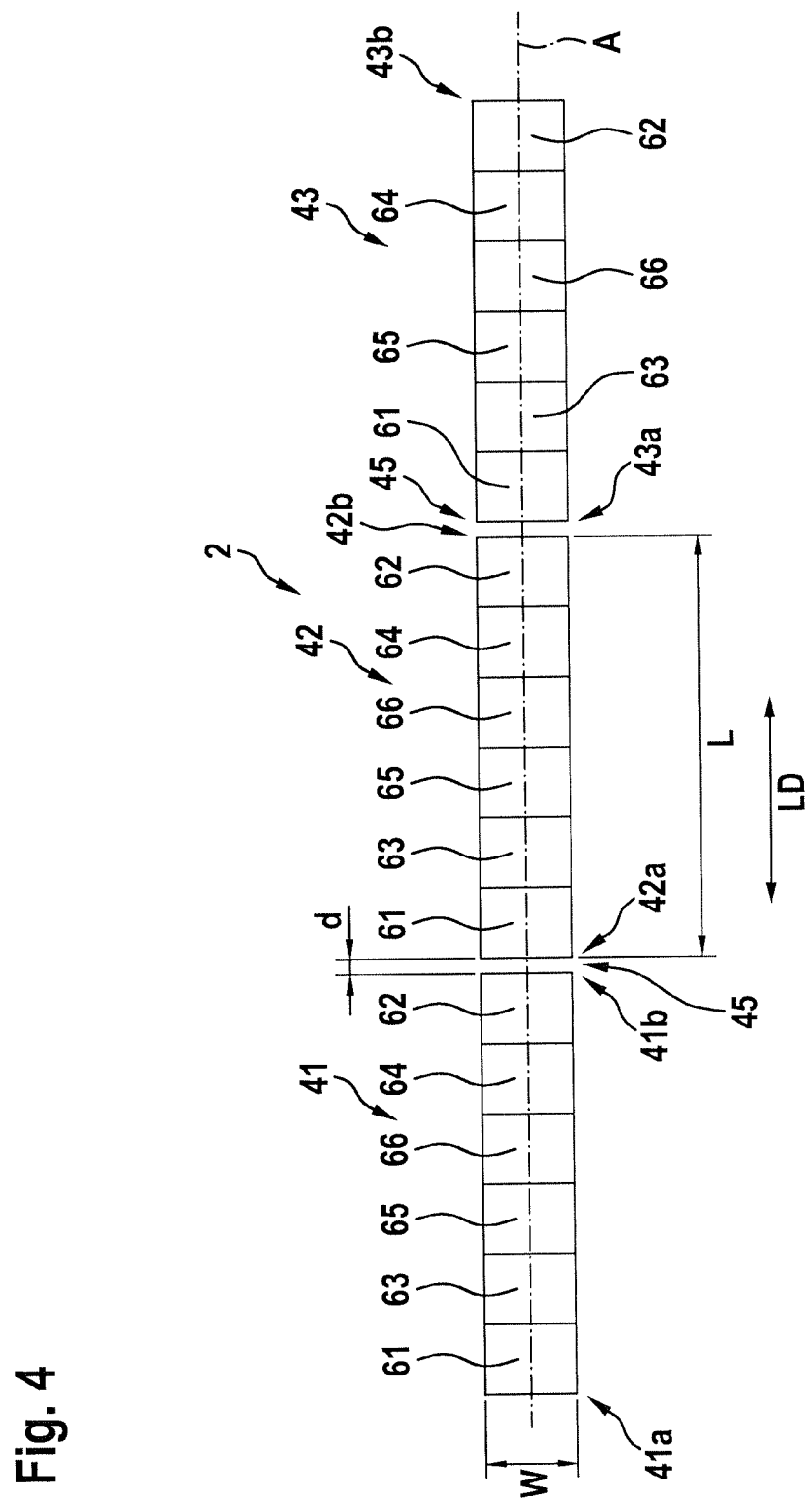
FIG. 4 depicts a schematic view of an elongated interior aircraft light according to an exemplary embodiment of the invention.

FIG. 4 depicts a schematic view of an elongated interior aircraft light 2 according to an exemplary embodiment of the invention.

The elongated interior aircraft light 2 comprises three elongated light modules 41, 42, 43, which are arranged next to each other forming an array of elongated light modules 41, 42, 43.

In the exemplary embodiment depicted in FIG. 4, the light modules 41, 42, 43 are arranged along a straight line A. In alternative embodiments, which are not explicitly shown in the figures, the light modules 41, 42, 43 may be arranged on a curved line or in a another configuration, in which the light modules 41, 42, 43 are arranged next to each other forming an elongated interior aircraft light 2.

The number of three light modules 41, 42, 43, as depicted in FIG. 4, is exemplary as well. In further embodiments, which are not explicitly shown in the figures, the elongated interior aircraft light 2 may comprise only two or more than the depicted three light modules 41, 42, 43. The elongated interior aircraft light 2 may in particular comprise between ten and twenty or even more light modules.

The elongated interior aircraft light 2 may extend along a single seat row 80a-80d or along a plurality of seat rows 80a-80d. It is possible that a plurality of like elongated interior aircraft lights are arranged in a row-like arrangement and that the plurality of elongated interior aircraft lights jointly extend along all seat rows within the passenger cabin 104.

Although it is not explicitly shown in the figures, elongated interior aircraft lights according to exemplary embodiments of the invention may also be installed in other parts of the aircraft 100, such as galleys, washrooms and/or toilets.

Each light module 41, 42, 43 may have a length L in the range of between 10 mm and 50 mm, in particular a length L in the range of between 20 mm and 30 mm, more particularly a length L of 25 mm.

Each light module 41, 42, 43 may have a width W in the range of between 2 mm and 10 mm, in particular a width W of between 4 mm and 6 mm.

Gaps 45 may be formed between adjacent light modules 41, 42, 43. The gaps 45 may have an extension d of between 5 mm and 20 mm, in particular an extension d of between 10 mm and 15 mm. The extensions of the gaps 45 are defined as the spacing between adjacent light modules in a longitudinal direction LD.

Each of the light modules 41, 42, 43 comprises a plurality of light sources 61-66, in particular six light sources 61-66, which are arranged as an array of light sources 61-66, extending along a longitudinal direction LD.

In the exemplary embodiment depicted in FIG. 4, the light sources 61-66 are arranged on the straight line A. In alternative embodiments, which are not explicitly shown in the figures, the light sources 61-66 may be arranged on curved lines or on zig-zag lines, as long as the array of light sources 61-66 extends predominantly in the longitudinal direction LD.

The number of six light sources 61-66 is exemplary as well. In further embodiments, which are not explicitly shown in the figures, each light module 41, 42, 43 may comprise more or less than six light sources 61-66, respectively.

The light sources 61-66 may be LEDs, or each of the light sources 61-66 may comprise at least one LED, respectively.

The light sources 61-66 may further comprise optical elements, such as reflectors or lenses, which are not shown in FIG. 4.

According to an exemplary embodiment of the invention, the light sources 61-66 have different illuminating properties. The light sources 61-66 are in particular configured for emitting light of different colors. Using light sources 61-66, which are configured for illuminating light of different colors, allows for selectively adjusting the color of the light, which is emitted by each light module 41, 42, 43, by selectively switching and/or dimming the individual light sources 61-66 of each light module 41, 42, 43. This may allow for selectively changing the illumination of the passenger cabin 104, in which the elongated interior aircraft light 2 is installed.

Using light sources 61-66, which emit light having different colors, may, however, result in the formation of unpleasant or disturbing spots due to the interfaces or gaps 45 between adjacent light modules 41, 42, 43. These unpleasant or disturbing spots may include over-pronunciations of a single color or a mixed color that becomes prominent along a section of otherwise homogeneous illumination of the passenger cabin 104 provided by the light modules 41, 42, 43. In the example of a wall illumination light, the imperfect mixing of colors, which may result from the gaps 45 between adjacent light modules, may generate spots or regions of uneven and potentially unpleasant/disturbing illumination of the cabin wall. The uneven illumination may catch an observer's attention and may distract the passengers and/or cabin crew from their tasks during the flight, potentially even in emergency situations.

It is therefore beneficial to arrange the light sources 61-66 within each of the light modules 41, 42, 43 in a sequence, which reduces or even minimizes the risk of generating such unpleasant or disturbing spots/regions in the light output due to the interfaces or gaps 45 between adjacent light modules 41, 42, 43.

In the exemplary embodiment depicted in FIG. 4, each of the light modules 41, 42, 43 comprises a first light source 61, which is arranged close to a first end 41a, 42a, 43a of the respective light module 41, 42, 43, and a second light source 62, which is arranged close to a second end 41b, 42b, 43b of the respective light module 41, 42, 43. In the drawing plane of FIG. 4, the first ends 41a, 42a, 43a of the light modules 41, 42, 43 are oriented to the left side, and the second ends 41b, 42b, 43b of the light modules 41, 42, 43 are oriented to the right side, respectively. In an alternative configuration, which is not explicitly shown in the figures, the first ends 41a, 42a, 43a of the light modules 41, 42, 43 may be oriented to the right side, and the second ends 41b, 42b, 43b of the light modules 41, 42, 43 may be oriented to the left side, respectively.

In the exemplary embodiment depicted in FIG. 4, each of the light modules 41, 42, 43 has exactly six light sources 61-66. The six light sources 61-66 form a predefined set of light sources 61-66. The predefined set of light sources 61-66 may have been chosen in accordance with any sort of suitable criteria. For example, it is possible that the predefined set of light sources 61-66 has been put together, in order to enable a particular range of colors via the color mixing of the specific six light sources 61-66.

According to exemplary embodiments of the invention, the plurality of light sources 61-66 are not arranged in an arbitrary manner. Rather, in exemplary embodiments of the invention, the plurality of light sources or at least some of the plurality of light sources may be arranged in an elaborate sequence/order. From a design point of view, the six light sources 61-66 form a reservoir of light sources that may be arranged in a desired sequence/order. The six light sources 61-66 can therefore also be seen and referred to as a stock of light sources that is available for designing and manufacturing a light module.

In the exemplary embodiment of FIG. 4, each of the light modules 41, 42, 43 is formed from the same predefined set of light sources 61-66. In other words, similar stocks of light sources 61-66, i.e. stocks of light sources 61-66, in which each stock comprises the same types of light sources 61-66, are used for the light modules 41, 42, 43 of an elongated interior aircraft light 2 according to an exemplary embodiment of the invention. With respect to the illuminating properties, such as the colors or the chromaticities of the light, which is emitted by the light sources 61-66, each of the light modules 41, 42, 43 comprises the same combination of light sources 61-66, and the different light sources 61-66 are arranged in the same order in each of the light modules 41, 42, 43.

The sequence/order of the light sources 61-66 within each of the light modules 41, 42, 43 is set based on the illuminating properties of the plurality of light sources 61-66. The illuminating properties, which are considered for setting the order of the light sources 61-66, may include the chromaticity and/or the hue and/or the saturation and/or the intensity of the light, which is emitted by the light sources 61-66, when they are operated.

According to an embodiment of the invention, the first and second light sources 61, 62, which are arranged at the first and second ends 41a, 42a, 43a, 41b, 42b, 43b of the light modules 41, 42, 43, are selected from the stock of light sources 61-66, which are used for the respective light module 41, 42, 43, so that a difference of the illuminating properties between the first and second light sources 61, 62 is the smallest difference that is possible between all potential pairs of light sources 61-66 in the stock of light sources 61-66.

The difference of the illuminating properties may for example be defined as a weighted sum of the difference(s) of chromaticity and/or hue and/or saturation and/or intensity between the respective light sources.

The difference of the illuminating properties may also be defined as the distance between the chromaticities between the respective light sources in a predefined color space, in particular in the CIE1976 color space.

Figure 5:
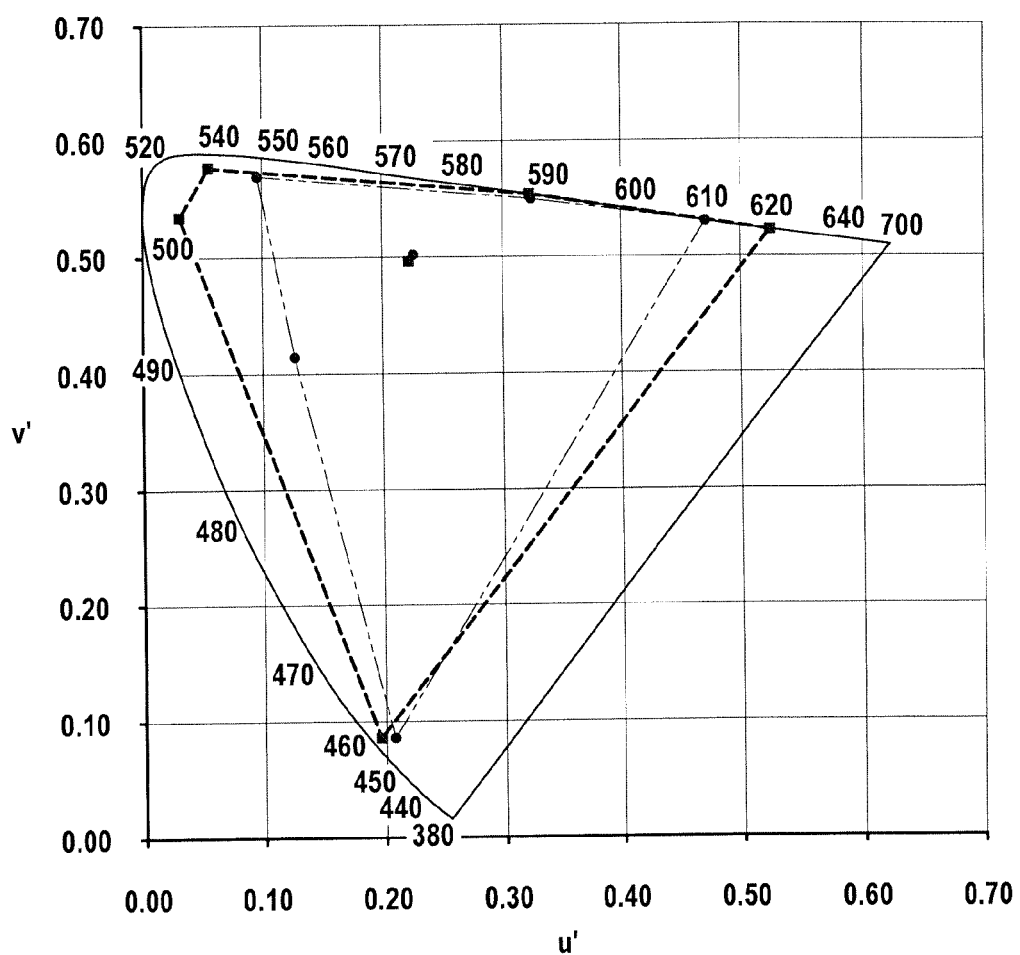
FIG. 5 depicts a diagram, in which the chromaticities of light, which is emitted by the light sources of first and second exemplary selections of six different light sources, are plotted in the CIE1976 color space.

FIG. 5 depicts a diagram of the CIE1976 color space, in which the coordinates u', v' of the chromaticities of light, which is emitted by the light sources 61-66 of first and second exemplary selections of six different light sources, are plotted. As is known to a skilled person familiar with the CIE1976 diagram, the numbers 380, 440, . . . , 640, 700, listed along the c-shaped left line around the area containing the different chromaticities, denote the wavelengths of the respective colors, given in nm.

In FIG. 5, the coordinates u', v' of the chromaticities of light, which is emitted by the light sources 61-66 of a first exemplary selection of the six different light sources 61-66, are plotted as dots in the CIE1976 color space.

Figures 6, 7A, 7B:
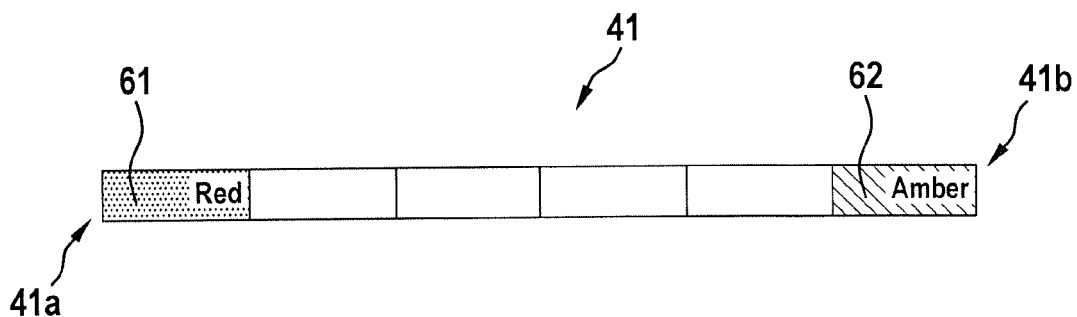
FIG. 6 depicts a table comprising the coordinates of the light emissions, which are emitted by the light sources of a first exemplary selection of six different light sources, in the CIE1976 color space.
FIG. 7A depicts a table comprising entries, which indicate the distances in the CIE1976 color space between the chromaticities of the light emissions, which are emitted by the light sources, for every possible pair of light sources, which may be formed from the first exemplary selection of light sources.
FIG. 7B schematically depicts a light module, in which the first and second light sources have been selected from the first exemplary selection of light sources and have been arranged in the light module.

FIG. 6 depicts a table, which comprises the coordinates u', v' of the chromaticities of the light, which is emitted by the light sources 61-66 of the first exemplary selection of six different light sources, in the CIE1976 color space.

The six different light sources 61-66 are configured for emitting light of six different colors, in particular "Blue", "Cyan", "Green", "Amber", "Red", and "White".

FIG. 7A depicts a table, in which each entry indicates a distance in the CIE1976 color space between the chromaticities of the light, which is emitted by a pair of light sources, as it is defined by the row and column of the respective entry. The table comprises fifteen entries, one entry for every possible pair of light sources, which may be formed from the exemplary first selection of six different light sources 61-66.

In the following steps, the light source that is configured for emitting "White" light is not considered, as it emits light having a much higher intensity than the other light sources. Therefore, its light emission is not directly comparable to the other light sources.

"White light" may be defined as a region of chromaticities within a color space, in particular within a region within the CIE1976 color space, more in particular as a region around the point u'=0.22 and v'=0.50 in the CIE1976 color space. The region, which defines the "white light", may have a radius in the range of between 0.02 to 0.05 in the CIE1976 color space, as may be appreciated in See FIG. 5.

The table, which is depicted in FIG. 7A, shows that, when the light source, which is configured for emitting "White" light, is excluded, the distance of 0.150 between the chromaticities between the light source, which is configured for emitting "Red" light, and the light source, which is configured for emitting "Amber" light, is the smallest distance among all possible pairs of light sources 61-66.

The light source emitting "Red" light is selected as the first light source 61, and the light source emitting "Amber" light is selected as the second light source 62, at is depicted in FIG. 7B. Alternatively, the light source emitting "Amber" light could be selected as the first light source 61, and the light source emitting "Red" light could be selected as the second light source 62.

In a next step, a third light source 63, which is to be arranged next to the first light source 61, is selected from the remainder of the stock of light sources, i.e. from the plurality of light sources except for the "White" light source and except for the "Red" and "Amber" light sources, which have already been selected as the first and second light sources 61, 62.

The third light source 63 is selected from the remainder of the stock of light sources so that the difference of the illuminating properties between the first light source 61 and the third light source 63 is the largest difference that is possible for all potential pairs of light sources that may be formed from the first light source 61, i.e. the "Red" light source, and the remaining light sources, i.e. the "Blue", "Cyan", and "Green" light sources.

Figures 7C, 7D, 7E:
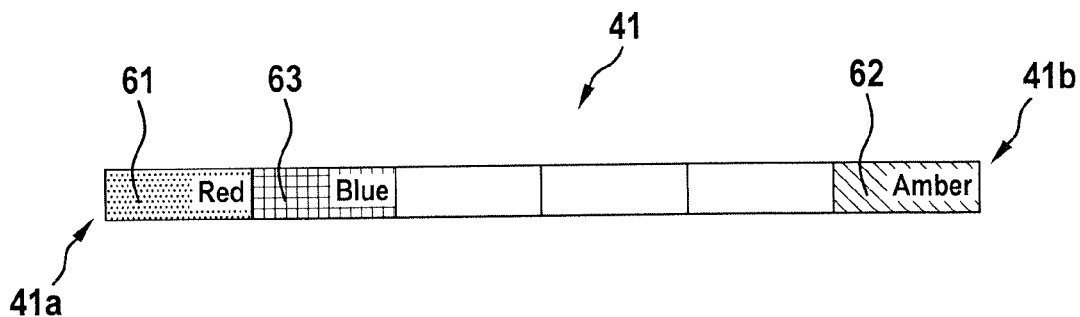
FIG. 7C depicts a table comprising entries, which indicate the distances in the CIE1976 color space between the chromaticities of the light emissions, which are emitted by the light sources, for every possible pair of light sources, which may be formed from the remaining light sources of the first exemplary selection of light sources.
FIG. 7D schematically depicts a light module, in which the first, second, and third light sources have been selected from the first exemplary selection of light sources and have been arranged in the light module.
FIG. 7E depicts a table comprising entries, which indicate the distances in the CIE1976 color space between the chromaticities of the light emissions, which are emitted by the light sources, for every possible pair of light sources, which may be formed from the remaining light sources of the first exemplary selection of light sources.

FIG. 7C shows that the largest possible difference, having a value of 0.513, is present, when the light source emitting "Blue" light is selected as the third light source 63. Thus, the light source emitting "Blue" light is selected as the third light source 63 and arranged next to the first ("Red") light source 61, as it is depicted in FIG. 7D.

In a next step, a fourth light source 64, which is to be arranged next to the second light source 62, is selected from the remainder of the stock of light sources, i.e. from the plurality of light sources except for the "White" light source and except for the "Red", "Amber", and "Blue" light sources, which have already been selected as the first, second, and third light sources 61, 62, 63.

The fourth light source 64 is selected from the remainder of the stock of light sources so that the difference of the illuminating properties between the second light source 62 and the fourth light source 64 is the largest difference that is possible for all potential pairs of light sources that may be formed from the second light source 62, i.e. the "Amber" light source, and the remaining light sources, i.e. the "Cyan" and "Green" light sources.

FIG. 7E shows that the largest possible difference, having a value of 0.239, is present when the light source emitting "Cyan" light is selected as the fourth light source 64. Thus, the light source emitting "Cyan" light is selected as the fourth light source 64 and arranged next to the second ("Amber") light source 62, as it is depicted in FIG. 7F.

In a next step, a fifth light source 65, which is to be arranged next to the third light source 63, is selected from the remainder of the stock of light sources, i.e. from the plurality of light sources except for the "White" light source and except for the "Red", "Amber", "Blue" and "Cyan" light sources, which have already been selected as the first, second, third, and fourth light sources 61-64.

The fifth light source 65 is selected from the remainder of the stock of light sources so that the difference of the illuminating properties between the third light source 63 and the fifth light source 65 is the largest difference that is possible for all potential pairs of light sources 61-66 that may be formed from the third light source 63, i.e. the "Blue" light source, and the remaining light sources.

With the "White" light source being disregarded for the selection process, only the "Green" light source is left, as can be seen in the table of FIG. 7G, and above described selection—by default—leads to the "Green" light source being selected as the fifth light source 65. The "Green" light source is arranged next to the third ("Blue") light source 63, as it is depicted in FIG. 7H.

If the light module comprises more than six light sources, the steps, which have been described with respect to FIGS. 7C to 7H, may be repeated for all additional light sources, which are comprised in the stock of light sources, until no light source or only the "White" light source(s) is/are left.

In the exemplary embodiment having the first exemplary selection of six light sources 61-66, as introduced above, the light source emitting "White" light is arranged at the last free position within the light module 41, 42, 43. In the embodiment shown in FIGS. 5 to 7H, the light source emitting "White" light is arranged as the sixth light source 66 in the final empty position between the fourth ("Cyan") light source 64 and fifth ("Green") light source 65.

Figure 8:
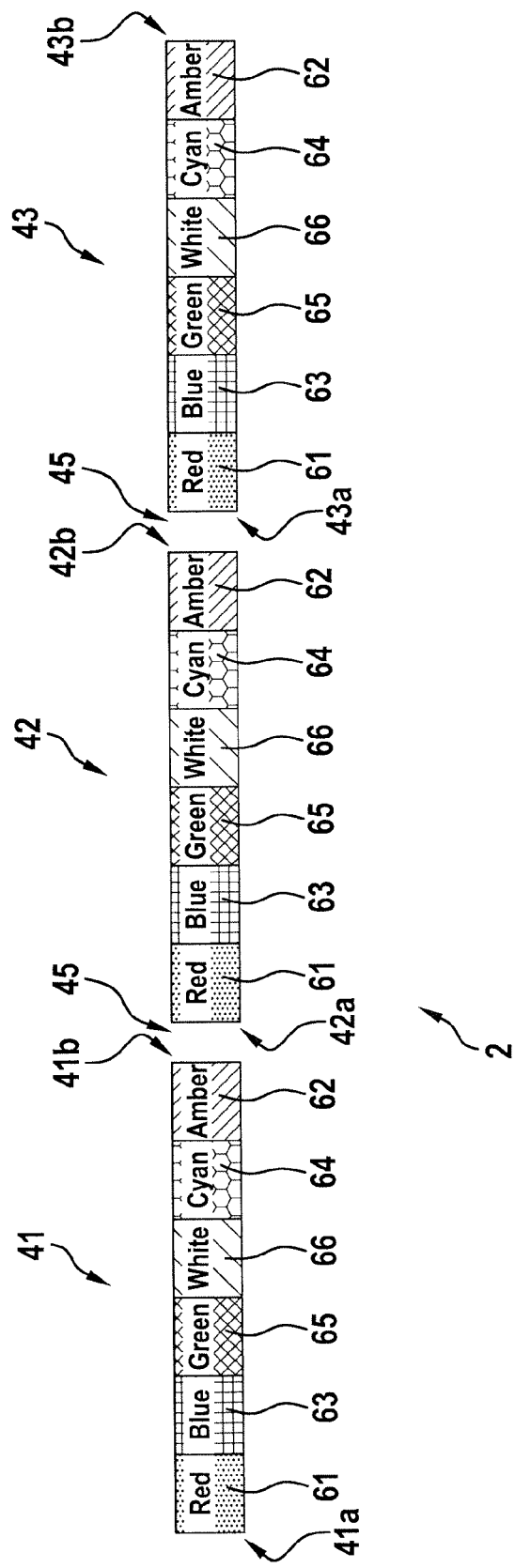
FIG. 8 schematically depicts an elongated interior aircraft light according to an exemplary embodiment of the invention, comprising three light modules according to a first exemplary embodiment of the invention.

FIG. 8 depicts a schematic view of an elongated interior aircraft light 2 in accordance with an exemplary embodiment of the invention, the elongated interior aircraft light 2 comprising three light modules 41, 42, 43. In each light module 41, 42, 43, the six light sources 61-66 are arranged in the order, which has been described above with reference to FIGS. 7A to 7H.

In each of the light modules 41, 42, 43, the six light sources 61-66 are arranged in a sequence comprising from left to right: the first light source 61 emitting "Red" light, the third light source 63 emitting "Blue" light, the fifth light source 65 emitting "Green" light, the sixth light source 66 emitting "White" light, the fourth light source 64 emitting "Cyan" light, and the second light source 62 emitting "Amber" light.

In an elongated interior aircraft light 2, as it is depicted in FIG. 8, the risk of generating an uneven illumination and/or unpleasant or disturbing spots/regions in the light output due to the interfaces or gaps 45 between adjacent light modules 41, 42, 43 is considerably reduced, since light sources 61, 62, which emit light of similar chromaticities, i.e. chromaticities, which are located close to each other in the CIE1976 color space, are employed as the first and second light sources 61, 62 on both sides of the interfaces or gaps 45.

Figures 9, 10A, 10B:
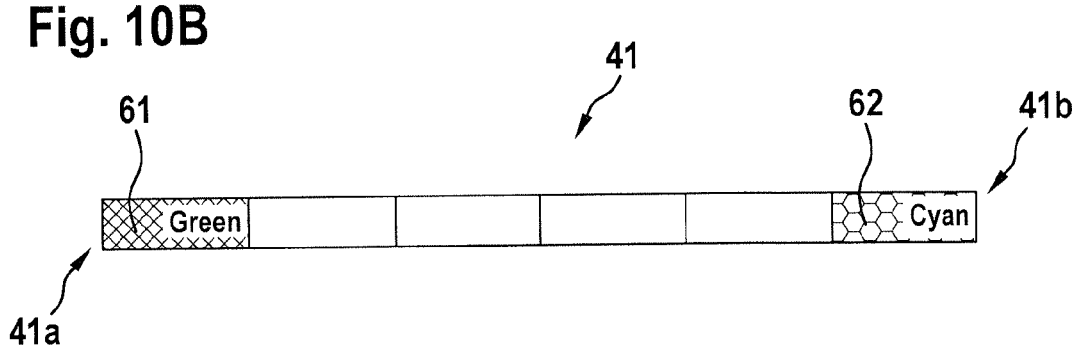
FIG. 9 depicts a table comprising the coordinates of the light, which is emitted by the light sources of a second exemplary selection of six different light sources, in the CIE1976 color space.
FIG. 10A depicts a table comprising entries, which indicate the distances in the CIE1976 color space between the chromaticities of the light emissions, which are emitted by the light sources, for every possible pair of light sources, which may be formed from the second exemplary selection of light sources.
FIG. 10B schematically depicts a light module, in which the first and second light sources have been selected from the second exemplary selection of light sources and have been arranged in the light module.

FIG. 9 depicts a table comprising the coordinates u', v' of the chromaticities of the light, which is emitted by the light sources 61-66 of the second exemplary selection of six different light sources 61-66, in the CIE1976 color space.

In FIG. 5, the coordinates u', v' of the chromaticities of light, which is emitted by the light sources 61-66 of the second exemplary selection of the six different light sources 61-66, are plotted as squares in the CIE1976 color space.

Again, the six light sources 61-66 are configured for illuminating light of six different colors, namely "Blue", "Cyan", "Green", "Amber", "Red", and "White". The colors are defined by their respective coordinates u', v' in the CIE1976 color space.

Although the names of the colors are identical to the names of the colors of the first example, which is depicted in FIGS. 6 to 8, it is noted that the coordinates u', v' of the light, which is emitted by the light sources 61-66 of the second exemplary selection, differ from the coordinates u', v' of the light, which is emitted by the light sources 61-66 of the first exemplary selection.

The first and second exemplary selections of light sources 61-66 may, for example, represent light sources, in particular LEDs 61-66, which are provided by two different manufactures and which therefore emit light of different chromaticities.

Due to the different chromaticities, which are represented by different coordinates u', v' in the CIE1976 color space, the order, in which the light sources 61-66 are arranged in the light modules 41, 42, 43 is different, when the same procedure, as it has been described before with respect to FIGS. 7A to 8, is applied to the light sources 61-66 of the second exemplary selection according to FIG. 9.

FIG. 10A depicts a table, in which each entry indicates a distance in the CIE1976 color space between the chromaticities of the light, which is emitted by a pair of light sources, as it is defined by the row and column of the respective entry. The table comprises fifteen entries, one entry for every possible pair of light sources, which may be formed from the second exemplary selection of six different light sources 61-66.

Again, the light source that is configured for emitting "White" light is not considered in the following steps, as it emits "White" light, which has a much higher intensity than the other light sources.

The table depicted in FIG. 10A shows that, when the light source emitting "White" light is excluded, the distance between the chromaticities between the light source emitting "Green" light and the light source emitting "Cyan" light, having a value of 0.047, is the lowest among all possible pairs of light sources 61-66.

The light source emitting "Green" light is selected as the first light source 61, and the light source emitting "Cyan" light is selected as the second light source 62, see FIG. 10B. Alternatively, the light source emitting "Cyan" light could be selected as the first light source 61, and the light source emitting "Green" light could be selected as the second light source 62.

In the following step, a third light source 63, which is to be arranged next to the first light source 61, is selected from the remainder of the stock of light sources, i.e. from the second exemplary selection of light sources 61-66 except for the light sources emitting "White" light, "Green" light and "Cyan" light, which have already been selected.

The third light source 63 is selected from the remainder of the stock of light sources so that the difference of the illuminating properties between the first light source 61 and the third light source 63 is the largest difference that is possible for all potential pairs of light sources that may be formed from the first light source 61, i.e. the "Green" light source, and the remainder of the stock of light sources, i.e. the "Blue", "Amber", and "Red" light sources.

In the present case, the light source emitting "Blue" light is selected as the third light source 63.

In a next step, a fourth light source 64, which is arranged next to the second light source 62, is selected from the remainder of the stock of light sources, i.e. from the second exemplary selection of light sources 61-66 except for the light sources emitting "White" light, "Green" light, "Cyan" light and "Blue" light.

The fourth light source 64 is selected from the remainder of the stock of light sources so that the difference of the illuminating properties between the second light source 62 and the fourth light source 64 is the largest difference that is possible for all potential pairs of light sources that may be formed from the second light source 62, i.e. the "Cyan" light source, and the remainder of the stock of light sources, i.e. the "Amber" and "Red" light sources.

In the present case, the light source emitting "Red" light is selected as the fourth light source 64.

In a next step, a fifth light source 65, which is arranged next to the third light source 63, is selected from the remainder of the stock of light sources, i.e. from the second exemplary selection of light sources 61-66 except for the light sources emitting "White" light, "Green" light, "Cyan" light, "Blue" light and "Red" light.

The fifth light source 65 is selected from the remainder of the stock of light sources so that the difference of the illuminating properties between the third light source 63 and the fifth light source 65 is the largest difference that is possible for all potential pairs of light sources that may be formed from the third light source 63, i.e. the "Blue" light source, and the remainder of the stock of light sources.

In the present case, the light source emitting "Amber" light is—by default—selected as the fifth light source 65.

If the light module comprises more than six light sources, the previous steps of selecting the next light sources, i.e. the steps of selecting the third and ensuing light sources, may be repeated for all additional light sources, which are comprised in the stock of light sources 61-66, until no light source or only the light source(s) emitting "White" light is/are left.

If only the light source(s) emitting "White" light is/are left, this light source/these light sources is/are arranged within the last empty position(s) of the light module 41, 42, 43. In the embodiment depicted in FIGS. 9 to 10B, the light source emitting "White" light is arranged as the sixth light source 66 between the fourth ("Red") light source 64 and the fifth ("Amber") light source 65.

Figure 11:
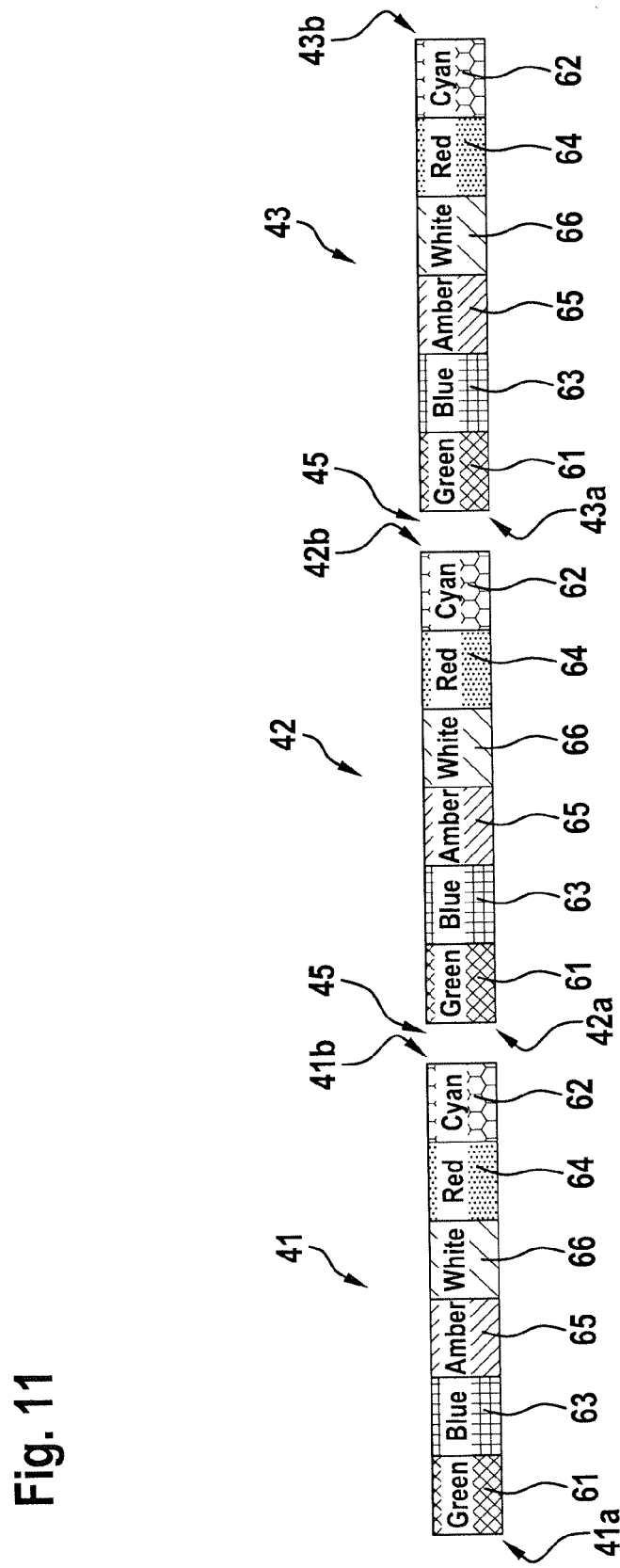
FIG. 11 schematically depicts an elongated interior aircraft light according to an exemplary embodiment of the invention, comprising three light modules according to a second exemplary embodiment of the invention.

The described procedure results in an elongated interior aircraft light 2 with the configuration of the light modules 41, 42, 43 that is depicted in FIG. 11.

In each of the light modules 41, 42, 43, the six light sources 61-66 are arranged in a sequence, which comprises from left to right: the first light source 61 emitting "Green" light, the third light source 63 emitting "Blue" light, the fifth light source 65 emitting "Amber" light, the sixth light source 66 emitting "White" light, the fourth light source 64 emitting "Red" light, and the second light source 62 emitting "Cyan" light.

In an elongated interior aircraft light 2, as it is depicted in FIG. 11, the risk of generating an uneven illumination and/or unpleasant or disturbing spots/regions in the light output due to the interfaces or gaps 45 between adjacent light modules 41, 42, 43 is considerably reduced, since light sources 61, 62, which emit light of similar chromaticities, i.e. chromaticities, which are located close to each other in the CIE1976 color space, are employed as the first and second light sources 61, 62 on both sides of the interfaces or gaps 45.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A light module for an elongated interior aircraft light, the light module comprising:
   a plurality of light sources, which are configured for emitting light of different colors and which are arranged next to each other, forming an array of light sources extending along a longitudinal direction (LD) between a first end and a second end;
   wherein the plurality of light sources include a first light source, which is arranged at the first end, and a second light source, which is arranged at the second end;
   wherein the first and second light sources are those from the plurality of light sources that result in a difference between the illuminating properties of the first and second light sources that is a smallest difference when compared to differences for all other potential pairs of light sources formed from the plurality of light sources;
   wherein the difference of the illuminating properties is a function of the difference in at least one of chromaticity, hue, saturation and intensity between the respective light sources.

2. The light module according to claim 1,
   wherein the difference of the illuminating properties is defined as a weighted sum of the difference in at least two of chromaticity, hue, saturation and intensity between the respective light sources.

3. The light module according to claim 1,
   wherein the difference of the illuminating properties is defined as a distance between the chromaticities of the respective light sources in a CIE1976 color space.

4. The light module according to claim 1, further comprising:
   a third light source, which is arranged next to the first light source,
   wherein the third light source is that light source from the remainder of the plurality of light sources that results in the largest difference of the illuminating properties between the first and third light sources when compared to all other pairs that can be formed with the first light source.

5. The light module according to claim 4, further comprising a fourth light source, which is arranged next to the second light source.

6. The light module according to claim 5, further comprising a fifth light source, which is arranged next to the third light source
   wherein the light module further comprises a sixth light source, which is arranged next to the fourth light source.

7. The light module according to claim 1, wherein the plurality of light sources include at least one white light source wherein said at least one white light source is positioned in at least one free position within the light module.

8. The light module according to claim 1, comprising six light sources,
   wherein the six light sources, when listed in an order which corresponds to a sequence of the light sources in the array of light sources, are configured to emit light having the following colors: amber, blue, cyan, white, green, orange; or
   wherein the six light sources, when listed in an order, which corresponds to the sequence of the light sources in the array of light sources, are configured to emit light having the following colors: red, blue, green, white, cyan, amber; or wherein the six light sources, when listed in an order, which corresponds to the sequence of the light sources in the array of light sources, are configured to emit light having the following colors: green, blue, amber, white, red, cyan.

9. The light module according to claim 1, wherein the plurality of light sources are LEDs or wherein each of the plurality of light sources comprises at least one LED.

10. An elongated interior aircraft light comprising:
a plurality of light modules according to claim 1,
wherein the pluralities of light sources of all of the plurality of light modules comprise the same types of light sources;
wherein the plurality of light modules are arranged next to each other forming an array of light modules extending in the longitudinal direction (LD); and
wherein the plurality of light modules are oriented so that for each pair of neighboring light modules, the first light source of a second light module of the respective pair of light modules is arranged next to the second light source of a first light module of the respective pair of light modules.

11. A method of arranging a plurality of light sources, which are configured for emitting light of different colors, as an array of light sources in a light module, wherein the array of light sources extends between a first end and an opposing second end in a longitudinal direction (LD), wherein the method comprising:
selecting a first light source and a second light source from the plurality of light sources, so that a difference of the illuminating properties between the first and second light sources that is a smallest difference when compared to differences for all potential pairs of light sources, which may be formed from the plurality of light sources, wherein the difference of the illuminating properties is a function of the difference in at least one of chromaticity, hue, saturation and intensity between the respective light sources;
arranging the first light source at the first end of the array of light sources; and
arranging the second light source at the second end of the array of light sources.

12. The method according to claim 11,
wherein the difference of the illuminating properties is defined as a weighted sum of the difference in chromaticity and/or in hue and/or in saturation and/or in intensity between the respective light sources, and/or
wherein the difference of the illuminating properties is defined as a distance between the chromaticities of the respective light sources in a CIE1976 color space.

13. The method according to claim 12, further comprising:
selecting a third light source from the remainder of the plurality of light sources so that the difference of the illuminating properties between the first and third light sources is the largest difference that is possible for all potential pairs of light sources, which may be formed from the first light source and the remainder of the plurality of light sources; and arranging the third light source next to the first light source; and selecting a fourth light source from a remainder of the plurality of light sources excluding the first, second and third light sources so that the difference of the illuminating properties between the second and fourth light sources is the largest difference that is possible for all potential pairs of light sources, which may be formed from the second light source and the remainder of the plurality of light sources; and arranging the fourth light source next to the second light source.

14. The method according to claim 13, further comprising:
selecting a fifth light source from the remainder of the plurality of light sources so that the difference of the illuminating properties between the third and fifth light sources is the largest difference that is possible for all potential pairs of light sources, which may be formed from the third light source and the remainder of the plurality of light sources;

and arranging the fifth light source next to the third light source; and selecting a sixth light source from a remainder of the plurality of light sources excluding the first, second, third, fourth and fifth light sources so that the difference of the illuminating properties between the fourth and sixth light sources is the largest difference that is possible for all potential pairs of light sources, which may be formed from the fourth light source and the remainder of the plurality of light sources; and arranging the sixth light source next to the fourth light source.

15. A method of assembling an elongated interior aircraft light by arranging a plurality of light modules according to claim 1, next to each other, forming an array of light modules extending in the longitudinal direction (LD), wherein the method includes:
arranging neighboring light modules in an orientation in which, for each pair of neighboring light modules, the second light source of a first one of the respective pair of light modules is arranged next to the first light source of a second one of the respective pair of light modules.

* * * * *